US009438329B2

(12) United States Patent
Toh et al.

(10) Patent No.: US 9,438,329 B2
(45) Date of Patent: Sep. 6, 2016

(54) WIRELESS COMMUNICATION SYSTEM

(71) Applicant: Hitachi Kokusai Electric Inc., Chiyoda-ku, Tokyo (JP)

(72) Inventors: Keat Beng Toh, Tokyo (JP); Masayuki Takekawa, Tokyo (JP); Keigo Hasegawa, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 14/647,181

(22) PCT Filed: Nov. 19, 2013

(86) PCT No.: PCT/JP2013/081107
§ 371 (c)(1),
(2) Date: May 26, 2015

(87) PCT Pub. No.: WO2014/087835
PCT Pub. Date: Jun. 12, 2014

(65) Prior Publication Data
US 2015/0311970 A1    Oct. 29, 2015

(30) Foreign Application Priority Data

Dec. 5, 2012    (JP) .................................. 2012-266117

(51) Int. Cl.
*H04B 7/08*   (2006.01)
*H04W 24/02*   (2009.01)

(52) U.S. Cl.
CPC ............. *H04B 7/086* (2013.01); *H04W 24/02* (2013.01)

(58) Field of Classification Search
CPC ............................... H04B 7/086; H04W 24/02
See application file for complete search history.

(56) References Cited

U.S. PATENT DOCUMENTS

2005/0184906 A1*   8/2005   Nakaya ............... H01Q 3/2605
                                                    342/377
2007/0037529 A1    2/2007   Nagai et al.
(Continued)

FOREIGN PATENT DOCUMENTS

JP    2004-147079 A    5/2004
JP    2005-269013 A    9/2005
(Continued)

OTHER PUBLICATIONS

International Search Report in Japanese Patent Application No. PCT/JP2013/081107 mailed Jan. 7, 2014.
Edited by the Institute of Electrical and Electronics Engineers, Inc. (IEEE) Computer Society, "IEEE Std 802.22-2011 Part 22: Cognitive Wireless RAN Medium Access Control (MAC) and Physical Layer (PHY) Specifications: Policies and Procedures for Operation in the TV Bands", (USA), IEEE Standards Association, Jul. 27, 2011.
(Continued)

*Primary Examiner* — Christopher Grey
(74) *Attorney, Agent, or Firm* — Brundidge & Stanger, P.C.

(57) ABSTRACT

A wireless communication terminal includes: an array antenna; a MAC processing section, provided to detect a first order system, that interprets information on a quiet period that the base station has informed of the MAC processing section in advance and generates a quiet period signal; a synthesizing section that weights signals received by antennas of the array antenna by using weighting coefficients, and combines the signals to produce a synthetic signal; and an array antenna control section that optimizes the weighting coefficients so as to reduce an interference signal received from the array antenna, over a period of presence of the quiet period signal. The optimized weighting coefficients are applied while downstream signals from the base station are being received, but are not applied while the primary usage system is being detected.

3 Claims, 3 Drawing Sheets

(56) References Cited

U.S. PATENT DOCUMENTS

2007/0165586 A1* 7/2007 Taylor ............... H04W 74/0808
                                                      370/338
2011/0128895 A1   6/2011 Sadek et al.

FOREIGN PATENT DOCUMENTS

| JP | 2005-311740 A | 11/2005 |
| JP | 2007166488 A  | 6/2007  |
| JP | 2008-306662 A | 12/2008 |
| JP | 2009-278503 A | 11/2009 |
| JP | 2010-199804 A | 9/2010  |
| JP | 480660 B2     | 8/2011  |
| WO | 2011/068765 A1 | 6/2011 |

OTHER PUBLICATIONS

Koji Fujii, "Eliminate waste of cognitive radio [Bureau], the core technology of the use of white space to reduce wasteful radiowave use", [online], Rictelcom, [retrieval date: Jun. 9, 2011], Internet <URL:http://businessnetwork.jp/tabid/65/artid/110/pages/1/Default.aspx>.

Nobuyoshi Kikuma, Fundamentals of Array Antennas:, Dept. of Computer Science and Engineering, Nagoya Institute of Technology, Gokiso-cho, Showa-ku, Nagoya, 466-8555, Japan, Internet, <URL:http//apmc-mwe.org/MicrowaveExhibition2010/program/tutorial2009/TL03-01.pdf>; with English Translation.

* cited by examiner

WIRELESS COMMUNICATION SYSTEM

CROSS-REFERENCE TO RELATED APPLICATION

This Application is a National Stage filing under 35 U.S.C. §371 of PCT Application No. PCT/JP2013/081107 filed on Nov. 19, 2013, which claims Priority of Japan Application No. 2012-266117 filed Dec. 5, 2012, the disclosures of which are hereby incorporated herein by reference in their entirety.

TECHNICAL FIELD

The present invention relates to wireless communication systems and devices that use white spaces. More specifically, the present invention relates to a technique for reducing interference which is applicable to wireless communication devices.

BACKGROUND ART

With the recent remarkable progress of information society, an increasing number of information communication apparatuses and services employ wireless communication in addition to wire communication as a communication method. This boosts the demand for radio frequencies that are a finite resource. Consequently, all nations around the world are faced with the problem in that frequencies to be allocated may be depleted. In general, each individual nation controls frequency usages by assigning licenses, and only licensed persons are permitted to use predetermined frequencies at specific places and times under strict control. In order to keep up with currently growing frequency demand, however, there is a need to conceive of a novel method of using frequencies which is free of traditional methods.

In recent years, in order to solve the problem of depletion of the frequencies, studies have been conducted on methods of using frequency bands (white spaces) that have already been allocated but not been used spatially and temporally. To give an example, cognitive wireless communication systems have been studied. Such systems permit non-licensed users (referred to below as "secondary users") to use white spaces flexibly while sufficiently avoiding affecting incumbent systems for licensed users (referred to below as "primary users") which are operating at certain frequencies (e.g., refer to Non Patent Literature 1).

IEEE (Institute of Electrical and Electronics Engineers) 802.22 standardizes a wireless communication system (wireless regional area network (WRAN)) using white spaces. In this system, a wireless station accesses a database (DB) over an IP network, and acquires an available channel list (frequency list) and maximum permitted transmitting power on the basis of its location information. The available channel list is continuously updated and exclusively managed by a spectrum manager (SM) within a base station (BS). The BS decides on channels available for communications through the available channel list, and sets these channels as operational channels. Then, the base station BS communicates with terminals (customer premises equipment (CPE)), such as mobile units and portable phones, installed individually within the coverage area (cell) of the base station BS.

The SM also manages spectrum sensing information. Wireless stations, such as the BS and the CPE, may each be equipped with a spectrum sensing function. When each wireless station detects that the operational channel is used by an incumbent system (primary user's system) through the spectrum sensing function, it notifies the SM of information regarding the detection. Then, the SM notifies the DB of the detected information, and deletes this operational channel from the available channel list. In this way, the wireless communication system using white spaces makes dynamic spectrum accesses on the basis of continuously updated information, thereby enabling secondary users to conduct communications while avoiding affecting the channels used by the primary users.

According to IEEE 802.22, both a wireless communication system using white spaces and a system for a primary user's system (e.g., digital television (DTV)) use the same frequency band. Accordingly, the wireless communication system using white spaces needs to avoid affecting primary users' systems. For that purpose, it is necessary to restrict the transmission power. According to IEEE 802.22, for example, if a wireless communication system using white spaces is a fixed wireless station, the maximum transmission power is 4 W; if it is a portable wireless station, the maximum transmission power is 100 mW. Because of the limitation on the transmission power, a wireless station using white spaces receives relatively strong interference from a DTV system, which is problematic to its operation.

An exemplary wireless system known in the art is designed to easily avoid interference caused by the communication between a plurality wireless base stations. This wireless system includes a plurality of wireless base stations that conduct wireless communication with one another. Each wireless base station has an adaptive array antenna constituted of a plurality of antenna elements. The wireless system stores link identification data that is assigned uniquely to a linear propagation path for communication between the wireless system and a partner wireless base station, in relation to another wireless base station that acts as an interference source during this communication. When the wireless system receives the link identification data from the partner wireless base station, it performs null control on the basis of the link identification data in such a way that the null point is oriented to the wireless base station acting as an interference source (e.g., refer to Patent Literature 1).

CITATION LIST

Patent Literature

Patent Literature 1: JP 2004-147079 A
Patent Literature 2: JP 2008-306662 A
Patent Literature 3: JP 4806660 B

Non Patent Literature

Non Patent Literature 1: Kouji FUJII, "Cognitive wireless transmission: Core technique for utilizing white space to reduce wasteful radio wave use," [online], RIC TELECOM, [retrieval date: Jun. 9, 2011], Internet <URL:http://business-network.jp/tabid/65/artid/110/page/1/Default.aspx>
Non Patent Literature 2: Nobuyoshi KIKUMA, "Basic of array antenna," Internet, <URL:http://apmc-mwe.org/MicrowaveExhibition2010/program/tutorial2009/TL03-01.pdf>
Non Patent Literature 3: Edited by The Institute of Electrical and Electronics Engineers, Inc. (IEEE) Computer Society, "IEEE Std 802.22-2011 Part 22: Cognitive Wireless RAN Medium Access Control (MAC) and Physical Layer (PHY) Specifications: Policies and Procedures for Operation in the TV Bands," (USA), IEEE Standards Association, Jul. 27, 2011

SUMMARY OF INVENTION

Technical Problem

To date, for wireless communication systems, influences on primary users' systems have been discussed many times and a large number of measures have been taken against the influences. However, even if influences on primary users' systems can be avoided, secondary users' systems may be affected by the primary users' systems. Due to interference from a primary user's system, a wireless communication system using white spaces shrinks its coverage area.

An object of the present invention is to provide a wireless communication system using white spaces that is capable of reducing interference from primary users' systems.

Solution to Problem

A wireless communication system of the present invention includes a base station and a wireless communication terminal that communicate with each other. The wireless communication terminal includes an array antenna, interference wave detecting means, and interference wave arrival direction estimating means. The interference wave detecting means receives an interference wave during communication between the base station and the wireless communication terminal. The interference wave arrival direction estimating means detects a steering vector from the interference wave signal received by the interference wave detecting means.

In the wireless communication system of the present invention, the wireless communication terminal further includes interference wave reducing means.

In the wireless communication system of the present invention, the interference wave reducing means applies the steering vector to the array antenna.

Advantageous Effects of Invention

According to the present invention, if the coverage area of a secondary user's system (e.g., the wireless communication system) is shrunk due to interference from a primary user's system (e.g., DTV), a wireless communication system using white spaces is capable of minimizing the shrinkage of the coverage area by reducing the interference by the primary user's system.

DESCRIPTION OF EMBODIMENTS

Details of the present invention will be described below with reference to the accompanying drawings.

Figure 1:
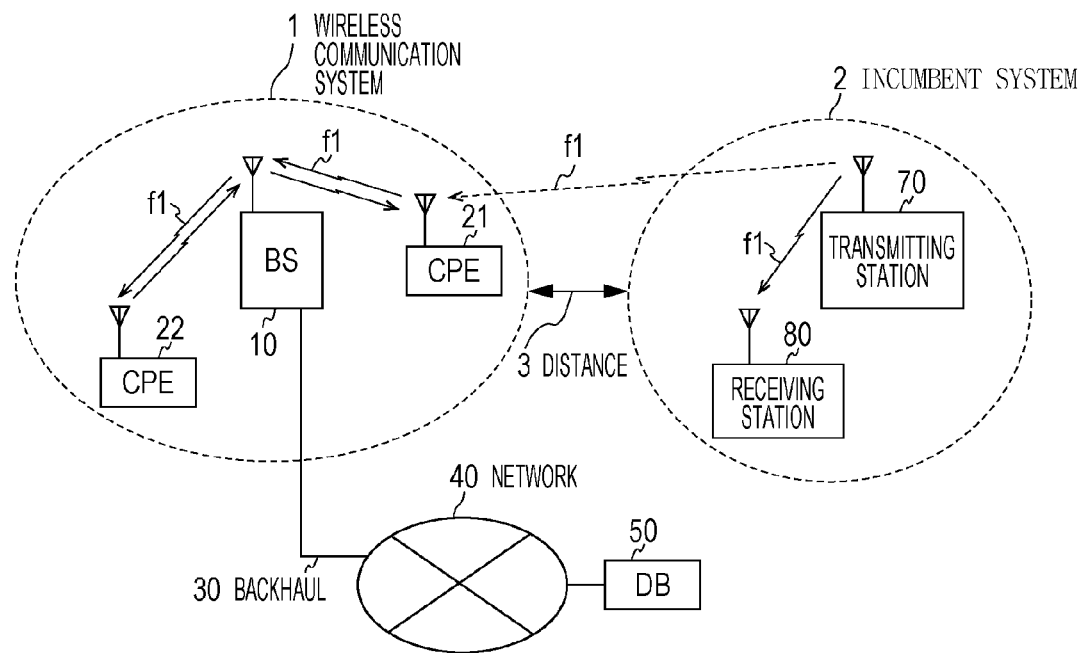
FIG. 1 illustrates a configuration of a wireless communication system in an embodiment of the present invention.

FIG. 1 illustrates an exemplary overall configuration of a wireless communication system in an embodiment of the present invention. The wireless communication system 1 in this embodiment is configured to use white spaces.

As illustrated in FIG. 1, the wireless communication system 1 includes a CPE 21 and a CPE 22 installed individually; each of the CPE 21 and the CPE 22 serves as a wireless communication terminal. These wireless communication terminals are connected to a BS 10 that serves as a base station. The wireless communication system 1 further includes a backhaul 30 for the BS 10, a network 40, and a white space database (referred to below as a "database") 50.

The BS 10 is connected to the network 40 via the backhaul 30 and is configured to access the database 50 present over the network.

A communication system (referred to below as an "incumbent system") 2 for a primary user who has a national license to use a predetermined frequency includes a transmitting station 70 and a receiving station 80. Here, the primary user of the incumbent system 2 is assumed to have a national license to use a frequency f1. In the description that will be given below, it is assumed that a secondary user does not have a national license to use the frequency f1 but uses it as a white space.

Suppose the incumbent system 2 is conducting communication at the frequency f1, as illustrated in FIG. 1. The coverage area of the wireless communication system 1 is provided such that it is away from the coverage area of the incumbent system 2 by a sufficiently long distance 3. Furthermore, the transmission power of a wireless station in the wireless communication system 1 is set to a sufficiently low level. With this configuration, even when the wireless communication system 1 transmits a signal at the frequency f1, the wireless communication system 1 can conduct communication without interfering with the incumbent system 2. The distance 3 satisfies protection criteria for preventing electromagnetic waves emitted by the wireless communication system 1 from affecting the intensity of a received electric field within the coverage area of the incumbent system 2. The protection criterion for the distance 3 should be specified by a predetermined regulatory agency. In this way, such white space wireless systems can make the most of a geographically available frequency resource.

Suppose the incumbent system 2 is applied to a DTV broadcast system conforming to IEEE 802.22. The DTV broadcast system employs a high-order modulation scheme, and accordingly strong electric field is generated in use. Moreover, in many cases, the broadcast area for the incumbent system 2 has a longer radius than the coverage area of the wireless communication system 1. Therefore, DTV broadcast signals are likely to be still strong outside the incumbent system 2. In this case, these strong signals may travel to the coverage area of the wireless communication system 1 and degrade the signal-to-interference power ratio (SIR) for the wireless communication system 1. Consequently, the wireless communication system 1 can avoid affecting the incumbent system 2 by ensuring the sufficiently long distance 3, but may receive interference from the incumbent system 2. This could result in the shrinkage of the coverage area of the wireless communication system 1. Thus, a technique is required to reduce interference that the wireless communication terminals in the wireless communication system 1 receive from the incumbent system 2.

For example, the technique for reducing interference may employ a maximum signal-to-noise ratio method (MSN) array antenna described in Non Patent Literature 2. Using this antenna can reduce the interference from the incumbent system 2. A description will be given below of a method of deriving the optimum weights for an adaptive array on the basis of an MSN algorithm.

The MSN algorithm is used to adjust the weighting coefficients so that the output SNR is maximized. First, the output SNR as an evaluation function is determined. It is assumed that an input vector x(t) is composed of a desired wave component s(t), an interference wave component u(t) and a noise component n(t), as expressed by equation 1.

[Mathematical Formula 1]

$$x(t)=s(t)+u(t)+n(t) \qquad \text{(Mathematical Formula 1)}$$

Then, a desired wave component ys(t), an interference wave component yu(t) and a noise component yn(t) in the output from the adaptive array are expressed by equations 2, 3 and 4, respectively.

[Mathematical Formula 2]

$$y_s(t)=w^H s(t)=s^T(t)w^* \qquad \text{(Mathematical Formula 2)}$$

[Mathematical Formula 3]

$$y_u(t)=w^H u(t)=u^T(t)w^* \qquad \text{(Mathematical Formula 3)}$$

[Mathematical Formula 4]

$$y_n(t)=w^H n(t)=n^T(t)w^* \qquad \text{(Mathematical Formula 4)}$$

where H, T, and denote conjugate transpose, transpose and complex conjugate, respectively.

The respective output powers are expressed by equations 5, 6 and 7.

[Mathematical Formula 5]

$$P_{S\,out} = \frac{1}{2}E[|y_s(t)|^2] = \frac{1}{2}w^H R_{ss} w \qquad \text{(Mathematical Formula 5)}$$

[Mathematical Formula 6]

$$P_{U\,out} = \frac{1}{2}E[|y_u(t)|^2] = \frac{1}{2}w^H R_{uu} w \qquad \text{(Mathematical Formula 6)}$$

[Mathematical Formula 7]

$$P_{N\,out} = \frac{1}{2}E[|y_n(t)|^2] = \frac{1}{2}P_n w^H w \qquad \text{(Mathematical Formula 7)}$$

where E[ ] is an expected value, Rss and Ruu are the correlation matrices of the desired and interference waves, respectively, and Pn is the noise power for each element.

Assuming the desired wave has a sufficiently narrow bandwidth, the desired wave component s(t) can be expressed by equation 8.

[Mathematical Formula 8]

$$s(t)=s(t)v_s=s(t)a(\theta_s) \qquad \text{(Mathematical Formula 8)}$$

where s(t) in the second term denotes the complex amplitude (not vector) of the desired wave at a phase reference point, vs denotes an array response vector in the direction of the desired wave, and θs denotes the arrival angle of the desired wave. In this case, Rss is denoted by equation 9.

[Mathematical Formula 9]

$$R_{ss}=E[s(t)s^H(t)]=P_s v_s v_s^H \qquad \text{(Mathematical Formula 9)}$$

where Ps denotes the input power of the desired wave for each element. Accordingly, the output SNR is expressed by equation 10.

[Mathematical Formula 10]

$$SNR = \frac{P_{S\,out}}{P_{U\,out}+P_{N\,out}} = \frac{w^H R_{ss} w}{w^H R_{nn} w} \qquad \text{(Mathematical Formula 10)}$$

where Rnn denotes the correlation matrix of the undesired wave component (interference wave and noise), and is defined by equation 11.

[Mathematical Formula 11]

$$R_{nn}=R_{uu}+P_n I \qquad \text{(Mathematical Formula 11)}$$

where I denotes a unit matrix.

It is possible to determine the weight vector W (optimum weight) that provides the maximum output SNR by setting the gradient related to the weight vector in equation 10 to 0, or from equation 12.

[Mathematical Formula 12]

$$\Delta_w[SNR]=0 \qquad \text{(Mathematical Formula 12)}$$

Finally, by using the relationship between equations 9 and 13, the optimum weight Wopt is obtained from equation 14.

[Mathematical Formula 13]

$$R_{xx}=P_s v_s v_s^H + R_{nn} \qquad \text{(Mathematical Formula 13)}$$

[Mathematical Formula 14]

$$w_{opt}=R_{xx}^{-1} v_s \qquad \text{(Mathematical Formula 14)}$$

Equation 14 expresses the optimum weight of the MSN adaptive array.

In order to determine the optimum weight Wopt, information regarding the arrival direction of the desired wave is required, because Vs (called a steering vector in the MSN) is used in equation 15. It is known that a desired wave reaches a CPE in the wireless communication system 1 at 0 degrees with respect to the direction from the base station, but the arrival direction of an interference wave is required to be estimated. In order to estimate an interference wave, it is necessary to receive and analyze an interference wave component during a quiet period (QP); the QP is provided to detect the incumbent system 2 and is a duration over which no communication is conducted. As a result, the steering vector of an interference wave can be detected.

[Mathematical Formula 15]

$$V_s=a(\theta_s) \qquad \text{(Mathematical Formula 15)}$$

Figure 2:
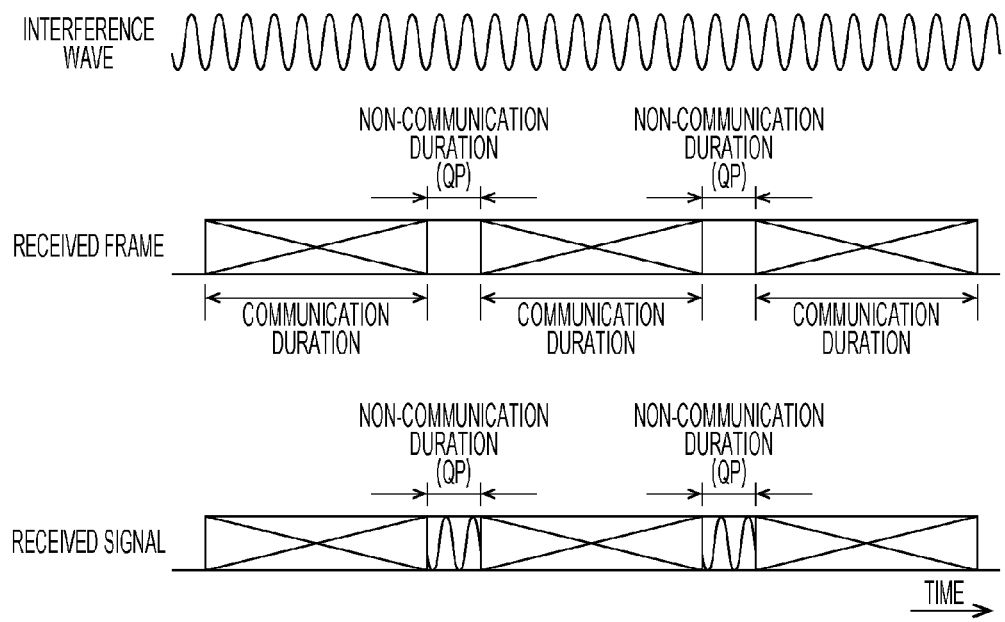
FIG. 2 illustrates waveforms for use in explaining how the wireless communication system in the embodiment of the present invention reduces interference wave signals.

FIG. 2 illustrates waveforms for use in explaining how the wireless communication system in the embodiment of the present invention attenuates interference wave signals.

As illustrated in FIG. 2, in the wireless communication system 1, the BS 10 (base station) does not communicate with both the CPEs 21 and 22 (wireless communication terminals) over the QP period. So, by receiving only an interference wave during this QP period, the steering vector of the interference wave can be detected.

Applying an MSN array antenna can reduce interference from a DTV and improve the coverage area of a wireless communication system using white spaces. Consequently, it is possible to improve the service efficiency of the overall system.

Example 1

In Example 1, a description will be given of an exemplary configuration of the wireless communication terminal (CPE 21 or 22) illustrated in FIG. 1. In this example, both the CPEs 21 and 22 are assumed to also conform to IEEE 802.22.

Figure 3:
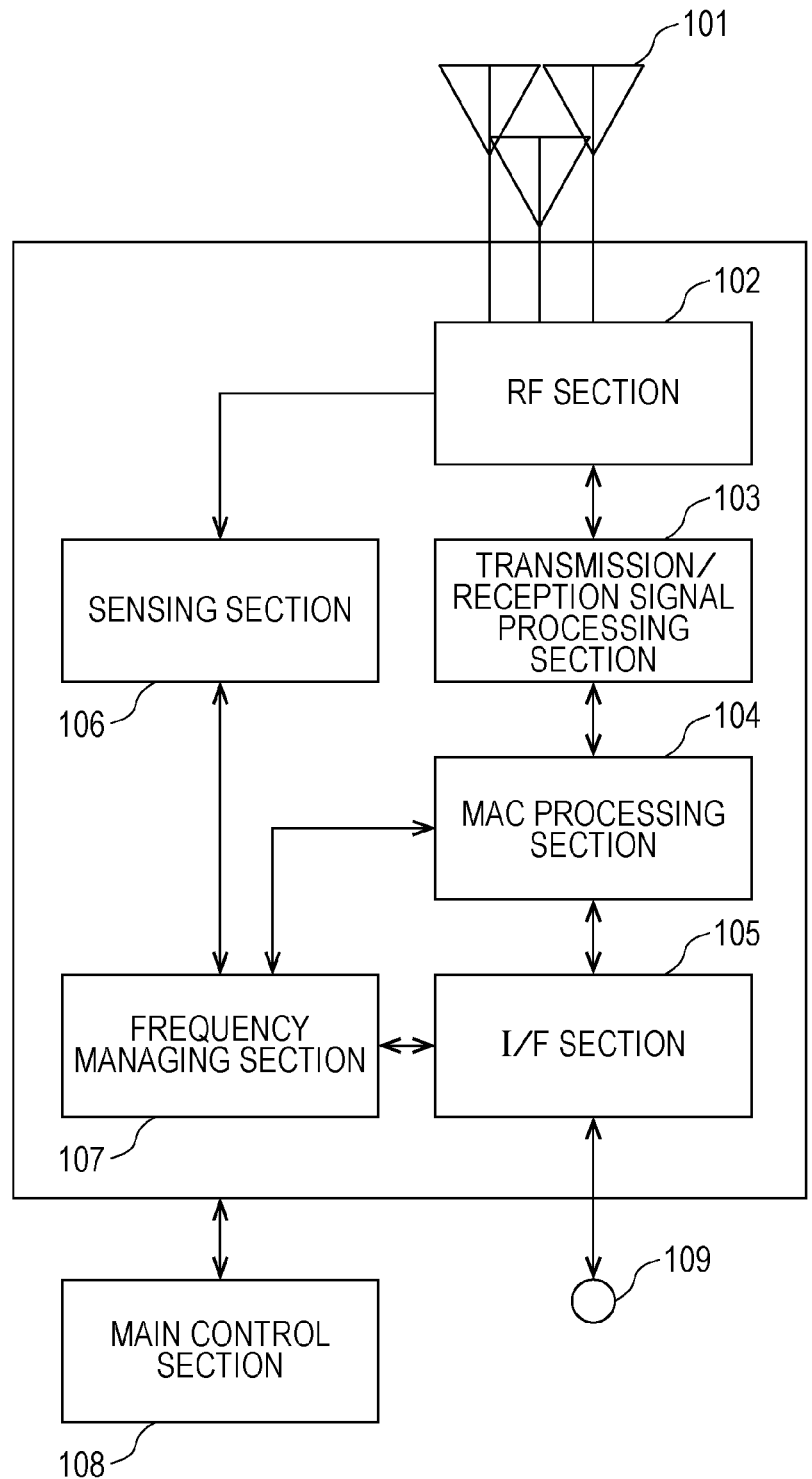
FIG. 3 is a functional block diagram of a wireless communication terminal 21 in Example 1 of the present invention.

FIG. 3 is a functional block diagram of a CPE 21, 22 or some other similar terminal in Example 1. The CPE 21 includes: an array antenna 101; an radio frequency (RF) section 102; a transmission/reception signal processing section 103; a medium access control (MAC) processing section 104; an I/F section 105; a sensing section 106; a frequency managing section (SM) 107; and a main control section 108. Specifically, for example, the RF section 102 makes frequency conversion from baseband (BB) signals to RF band signals or from radio frequency band signals to baseband signals, and then amplifies the signals. The transmission/reception signal processing section 103 performs an error correction encoding/decoding process and modulating/demodulating process. For example, the MAC processing section 104 controls a channel to be used and transmitting or receiving timing, adds IDs for identifying a wireless device to packets, and recognizes a source wireless device. The I/F section 105 serves as an interface for personal computers and WiFi routers. The sensing section 106 processes spectrum sensing signals, determining whether a wireless system using a channel is present. The frequency managing section (SM) 107 stores and manages channels that can be used as white spaces. The main control section 108 manages and controls the entire wireless device.

The array antenna 101 includes a plurality of antenna elements that can receive signals, independently of one another. Each antenna element may be any given antenna, such as a built-in inverted-F antenna, a horizontally non-directional dipole antenna or a high-gain Yagi antenna, and its orientation may be changed manually. The gain (directivity) of an antenna emitting an electromagnetic wave in a white space should be under sufficient control. A simple way to satisfy this need is using only one of the plurality antenna elements to transmit a signal, so that the gain is fixed. For the antenna elements, the individual operational frequencies (at which standing wave ratios are less than or equal to a preset value) may be set differently from one another. For example, they may be set to UHF-Low, Mid and High frequencies. Then, the optimum one of the antenna elements may be selected depending on an in-use frequency.

The MAC processing section 104 interprets a management message according to a MAC layer which has been received from the BS 11, and transmits this signal to the individual sections in order to follow the instructions in the management message. For example, the TDD timing (the start location of an upstream sub-frame) and the schedule of the QP period are notified of the CPE 21 as the management message. In the TDD system conforming to IEEE 802.22, the TDD timing is indispensable to, for example, the operation of the RF section 102. The MAC processing section 104 generates a QP period signal in accordance with the TDD timing as well as the received schedule of the QP period, and provides this signal to both the RF section 102 and the transmission/reception signal processing section 103.

The frequency managing section 107 can basically grasp available channels from the management message received from the BS 11. The frequency managing section 107 may be equipped with part of a self-coexistence function. More specifically, the frequency managing section 107 may detect the risk of an occurrence of interference, on the basis of, for example, a coexistence beacon received from a neighboring cell conforming to the same wireless scheme, and gives a notification to the BS.

The main control section 108 may be embodied by, for example, a processor, a data storage area defined in a memory, and software. Each of the transmission/reception signal processing section 103, the MAC processing section 104, the sensing section 106 and the frequency managing section 107 may be embodied by a program to be executed by the main control section 108.

Figure 4:
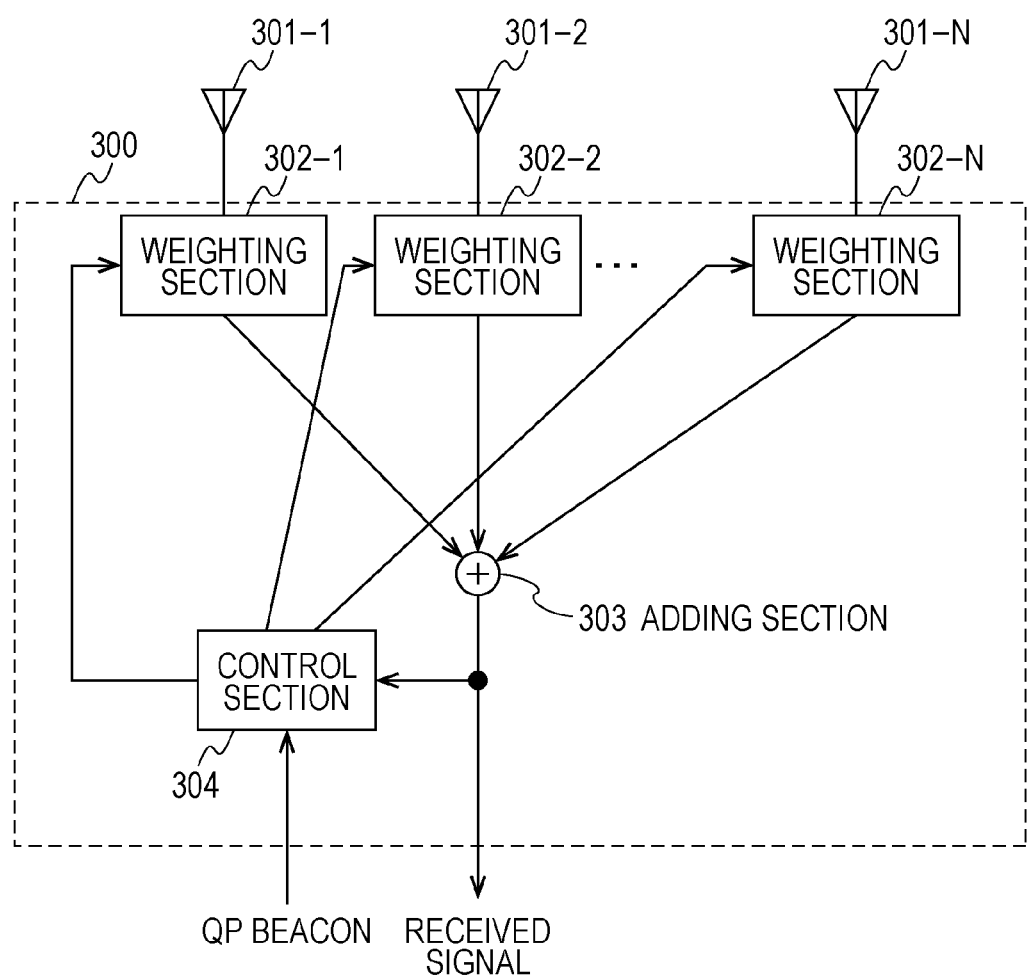
FIG. 4 is a functional block diagram of an adaptive array receiving section in the wireless communication terminal 21 in Example 1 of the present invention.

FIG. 4 is a functional block diagram of an adaptive array receiving section 300 in the CPE 21 in Example 1. The adaptive array receiving section 300 illustrated in FIG. 4 corresponds to part of the configuration of the RF section 102 and the transmission/reception signal processing section 103 illustrated in FIG. 3.

Respective received signals are extracted as appropriate from the feeder lines of antennas 301-1 to 301-3 in the array antenna 101 through, for example, a TDD switch, a circulator and a duplexer, and led to weighting sections 302-1 to 302-3.

Each of the weighting sections 302-1 to 302-3 applies the optimum weight obtained from equation 14 to its received signal.

The optimum weights are normalized in accordance with a predetermined rule, for example, such that the absolute sum (sum of squares) of the optimum weights may always become 1.

The adding section 303 combines the received signals weighted by the weighting sections 302-1 to 302-3 to generate a single synthetic signal, and then outputs this synthetic signal. As a result, the transmission/reception signal processing section 103 can handle it as if the received synthetic signal were a signal received from a single antenna. The synthetic signal generated thus may be given to the sensing section 106; however if a detection target is a first order system, it is more reliable to produce a synthetic signal by weighting the received signals as if the array antenna 101 were a non-directional antenna.

The control section 304 continuously updates the optimum weights on the basis of the received synthetic signal and the current optimum weight, and gives the updated optimum weights to the weighting section 302 while a received QP period signal (QP beacon) indicates the QP period. Over a period other than the QP period, however, the control section 304 maintains the current optimum weights without updating them. If a cross correlation matrix is determined directly, the individual received signals that the adding section 303 has not combined may be entered in the control section 304.

As described above, according to this example, a wireless communication terminal performs an MSN-algorithm-based operation over a quiet period in which its system neither transmits nor receives signals, namely, over a period in which all received signals are interference waves. This achieves an optimum steering without the expertise of interference waves, namely, automatically, regardless of the number of interference sources. In this case, a base station performs control in such away that its QP synchronizes with those of other adjacent base stations. Consequently, these base stations can stop transmitting signals and perform sensing operations simultaneously with one another at the time when the QP period starts.

According to the present invention, if the coverage area of a secondary user's system (e.g., the wireless communication system) is shrunk due to interference from a primary user's system (e.g., DTV), a wireless communication system using white spaces is capable of minimizing the shrinkage of the coverage area by reducing the interference.

The wireless communication system in this embodiment is applicable suitably to wireless communication systems conforming to IEEE 802.22; however its applications are not limiting.

The scope of the present invention is not limited to exemplary embodiments described herein and illustrated in the drawings. All possible embodiments that produce effects equivalent to that of objective embodiments of the present invention may be included in this scope. Moreover, the scope of the invention may be defined by desired possible combinations of specific ones of all features disclosed herein.

INDUSTRIAL APPLICABILITY

The present invention is applicable to wireless communication devices that select and use a frequency in a frequency band shared among other systems, and methods therefor. This invention is applicable suitably to wireless access systems using TV white spaces that conform to IEEE 802.22, IEEE 802.11af, IEEE 802.15.4m, IEEE 1900.7 (Dyspan), ECMA-392 or some other network standard.

REFERENCE SIGNS LIST 1 wireless communication system
10 BS
21, 22 CPE
3 distance
70 transmitting station
2 incumbent system
80 receiving station
30 backhaul
40 network
50 DB
101 array antenna 101
102 RF section
103 transmission/reception signal processing section
104 MAC (medium access control) processing section
105 I/F section
106 sensing section
107 frequency managing section (SM)
108 main control section
300 MSN adaptive array
301-1 to 301-N antenna
302-1 to 302-N weighting section
303 adding section
304 control section
FIG. 1
1 WIRELESS COMMUNICATION SYSTEM
3 DISTANCE
70 TRANSMITTING STATION
2 EXISTING SYSTEM
80 RECEIVING STATION
30 BACKHAUL
40 NETWORK
FIG. 2
INTERFERENCE WAVE
RECEIVED FRAME
NON-COMMUNICATION DURATION (QP)
COMMUNICATION DURATION
RECEIVED SIGNAL
TIME
FIG. 3
102 RF SECTION
103 TRANSMISSION/RECEPTION SIGNAL PROCESSING SECTION
104 MAC PROCESSING SECTION
105 I/F SECTION
106 SENSING SECTION
107 FREQUENCY MANAGING SECTION
108 MAIN CONTROL SECTION
FIG. 4
302-1 WEIGHTING SECTION
302-2 WEIGHTING SECTION
302-N WEIGHTING SECTION
303 ADDING SECTION
304 CONTROL SECTION
QP BEACON
RECEIVED SIGNAL

The invention claimed is:

1. A wireless communication system including a wireless communication terminal that communicates with a base station at a frequency in a white space, the wireless communication terminal comprising:
an array antenna;
a MAC processing section provided to detect a first order system, the MAC processing section interpreting information on a quiet period that the base station has informed of the MAC processing section in advance, and generating a quiet period signal;
a synthesizing section weighting signals received from antennas of the array antenna by using weighting coefficients, and combining the signals to produce a synthetic signal; and
an array antenna control section optimizing the weighting coefficients so as to reduce an interference signal received by the array antenna, over a period of presence of the quiet period signal.

2. The wireless communication terminal according to claim 1, wherein
the array antenna control section performs the optimization such that a signal-to-interference ratio is maximized.

3. The wireless communication terminal according to claim 2, wherein
the antennas of the array antenna operate at different frequencies, and one of the antennas which is the most compatible with a transmission frequency is used for transmission, and
the synthetic signal produced by the synthesizing section is handled as a signal received by a single antenna.

* * * * *